ARTICLE CARRIER

Original Filed Sept. 5, 1962

United States Patent Office

Re. 26,083
Reissued Sept. 20, 1966

26,083
ARTICLE CARRIER

Homer W. Forrer, Jonesboro, Ga., assignor to The Mead Corporation, a corporation of Ohio Original No. 3,203,584, dated Aug. 31, 1965, Ser. No. 221,565, Sept. 5, 1962. Application for reissue Jan. 24, 1966, Ser. No. 526,952
2 Claims. (Cl. 220—115)

Figure 1:
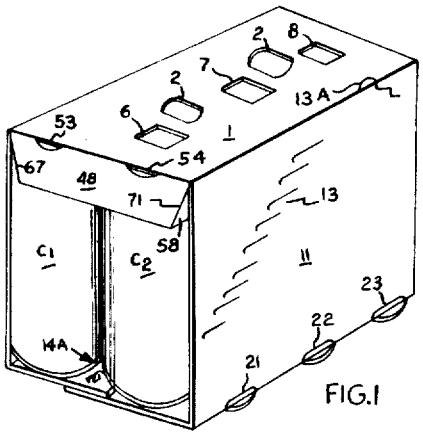

Matter enclosed in heavy brackets [ ] appears in the original patent but forms no part of this reissue specification; matter printed in italics indicates the additions made by reissue.

This invention relates to article carriers and more particularly to can carriers of the wrap-around type which are specially constructed so as to afford a maximum area of exposed panels for use as billboard advertising space and which are adapted according to the invention to hold a plurality of packaged items securely and closely together but without imposing substantial compressional stress on the packaged items.

Known paperboard carriers of the wrap-around type may be tightly formed about a group of articles to be packaged and in this way the packaged articles are held securely within the wrapper. One known manner of securing the wrapper ends together uses locking tabs in one end of the wrapper which are inserted into openings in the other end. Such wrappers require a relatively heavy duty paperboard of high quality in order to withstand the stress imposed on the wrapper and tend to impose substantial compressional stress on the articles to be packaged. Even where heavy duty paperboard is used, there is a tendency for the wrapper to tear at its corners and at the locks which hold the ends of the wrapper together.

Other known types of paperboard wrapper-type carriers are constructed so as to envelop a package group rather loosely and such wrappers are provided with suitable holding panels and other structural features which are adapted to hold the article within the wrapper. Loose packages of this type allow a limited relative vertical movement between the packaged articles. Where the package articles are chimed cans, such vertical movement causes the chimes of one can to ride over the chimes of another adjacent can and in so doing may cause damage to the adjacent can. The current practice of using thin metal for cans increases the possibility that damage to the cans will result causing leakage and loss of such cans and their contents.

A principal object of this invention is to provide a wrapper for use as an article carrier primarily in conjunction with chimed cans, the wrapper being constructed of relatively thin paperboard and being formed in such a way as to afford secure holding of a group of articles within the package group but without imposing substantial tensile stress on the wrapper itself or compressional stress on the packaged articles.

Another object of the invention is the provision of an improved article carrier in which a wrapper blank is specially constructed so as to prevent relative vertical motion between adjacent packaged items without imposing substantial tensile stress on the wrapper itself.

Still another object of the invention is to provide an improved package whereby safe and secure packaging of a group of articles is effected and wherein provision is made for maximum billboard space using paperboard of a relatively thin gauge.

A further object of the invention is the provision of an improved wrapper formed of relatively light weight paperboard and having its ends secured together by locking tabs and corresponding openings and wherein the weak areas of the blank such as its corners and locking means are provided with a double ply reinforced layer of paperboard.

The invention in one form may comprise a top main panel slightly wider than twice the diameter of one chimed can to be packaged, the diameter being measured across and including the chime, side walls foldably joined to the side edges of the top wall, lap panels foldably joined to the bottom edges of the side walls and secured to each other to form a composite bottom wall, the bottom wall being slightly narrower than the top wall, a plurality of slits formed at the bottom of each side wall at the fold line between the side walls and bottom wall, an end panel foldably joined to each end of the top main panel, a pair of slits formed along the fold line between the top panel and each end panel to receive the chimes of the end cans, and anchor panel foldably joined to each end edge of each side wall, the anchor panels being wider than the radius of the packaged cans, a reinforcing strip foldably joined to each end of each lap panel and to the bottom edge of each anchor panel and disposed against the inner surfaces of the lap panels, and a web panel interconnected between each end of each end panel and the adjacent end of each anchor panel, the web panels being interrelated with the end panels by an anchoring angle which is substantially greater than forty five (45) degrees and the web angle disposed at the vertex of the web adjacent each corner of the main panel being slightly greater than the anchoring angle in order to cause the end panel to hold the packaged items securely within the wrapper but without imposing substantial stress on the wrapper or the packaged items.

Figure 2:
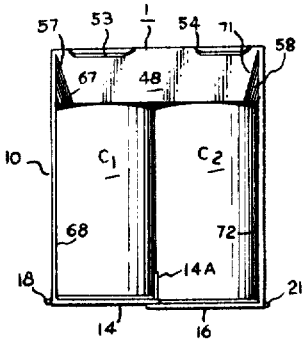
Figure 4:
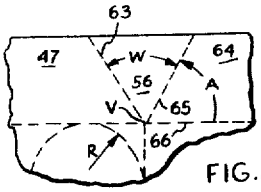
Figure 3:
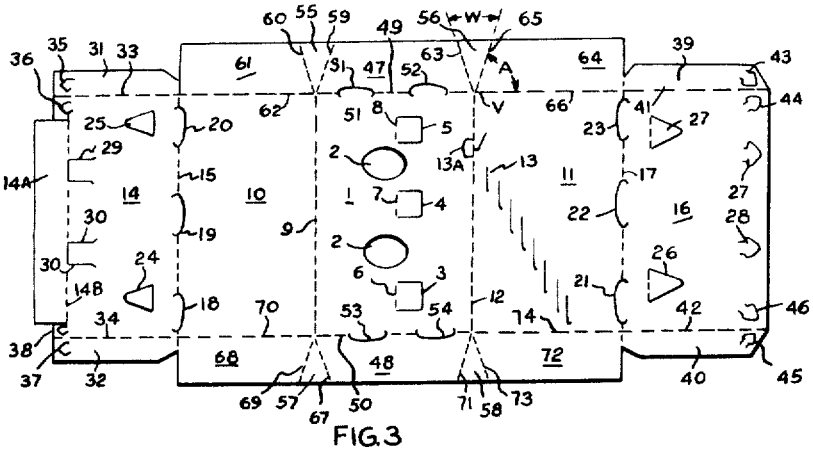

For a better understanding of the invention reference may be had to the following detailed description taken in conjunction with the accompanying drawings in which FIG. 1 is a perspective view of a package embodying the invention; FIG. 2 is an end view of the package shown in FIG. 1; FIG. 3 is a plan view of a wrapper blank constructed according to the invention and used to form the package depicted in FIGS. 1 and 2; and in which FIG. 4 is an enlarged diagrammatic representation of a portion of the blank depicted in FIG. 3 and by which certain features of the invention are depicted.

With reference to the drawings the numeral 1 is used to designate the main panel of the wrapper, such main panel ordinarily constituting the top of the package. It will be understood, however, that main panel 1 is not necessarily the top but could constitute the bottom of the package. A pair of finger gripping apertures 2 are formed within the main panel 1 and simply facilitate carrying the package in known manner. Also formed in the main panel 1 are the tabs 3, 4 and 5 which are struck out of main panel 1 and are respectively foldably joined thereto along fold lines 6, 7 and 8. As is well understood in the art, tabs 3, 4 and 5 are folded inwardly and serve to separate the cans in one row from the cans in the other row.

Foldably joined along the side edge 9 of the main panel 1 is a side wall 10. In similar fashion a side wall 11 is foldably joined to the other edge 12 of main panel 1. Formed in side wall 11 is a plurality of cut lines generally designated by the numeral 13 which in conjunction with a push out tab designated at 13A and formed in the main panel 1 serve to enable the user of the articles packaged within the wrapper to burst open the side wall 11 and thereby to gain ready access to the contents of the package.

The wall of the wrapper opposite from main wall 1 which usually is the bottom of the wrapper is a composite wall formed of a lap panel 14 foldably joined along fold line 15 to the bottom edge of side wall 10 and a similar lap panel 16 foldably joined along fold line 17 to the bottom edge of side wall 11.

For the purpose of forming a medial separating partition between the cans in one row and the cans in the other row adjacent the composite panel formed of lap panels 14 and 16 a partitioning strut 14A is foldably joined to the end of lap panel 14 along a fold line 14B. As shown in FIGS. 1 and 3 the strut 14A terminates short of the edge of panel 14.

For the purpose of receiving the chimes of the packaged cans a plurality of slits 18, 19 and 20 are formed along the fold lines 15 and similar slits 21, 22 and 23 are formed along the fold line 17.

For the purpose of tightening the wrapper about the group of articles to be packaged, the lap panels 14 and 16 are drawn toward each other adjacent one end of the packaged items and when the desired moderate degree of tightness is achieved the lap panels 14 and 16 are secured together. The tightening operation is performed by suitable machine elements which are caused to enter the tightening apertures 24 and 25 formed within lap panel 14 and by similar machine elements which enter tightening apertures 26 and 27 formed within lap panel 16.

The lap panels 14 and 16 are then secured together by suitable means such as by the locking tabs 27, 28 in panel 16 which are driven into the openings defined by the retaining tabs 29 and 30 formed in lap panel 14. It will be understood that the locking tabs 27 and 28 are ordinarily driven into the openings defined by retaining tabs 29 and 30 by suitable machine elements.

In order to strengthen the wrapper at its lower corners and at its locks in accordance with a feature of the invention, reinforcing panels 31 and 32 may be secured to the ends of lap panel 14 along fold lines 33 and 34, respectively. Such reinforcing panels 31 and 32 ordinarily are folded flat against the inner edges of lap panel 14 so that the retaining tab 35 formed in reinforcing panel 31 coincides with a similar retaining tab 36 formed in the corner of lap panel 14. In like fashion a retaining tab 37 coincides with a similar retaining tab 38 formed at the corner of lap panel 14 when the reinforcing panel 32 is folded over along fold line 34 and flat against the inside of the end of lap panel 14.

In like fashion reinforcing panels 39 and 40 may be foldably joined respectively to the ends of lap panel 16 by fold lines 41 and 42. A locking tab 43 coincides with a similar locking tab 44 when the reinforcing panel 39 is folded over along fold line 41 against the inside end of lap panel 16. In like fashion locking tab 45 formed in reinforcing panel 40 coincides with locking tab 46 formed in the corner of lap panel 16 when the reinforcing panel 40 is folded along fold line 42 flat against the inside end of lap panel 16. With the reinforcing panels 31, 32 and 39, 40 folded as described flat against their respective lap panels 14 and 16, machine elements drive the locking tabs 43, 44 into the opening defined by retaining tabs 35 and 36. Similarly machine elements drive the locking tabs 45, 46 into the opening defined by the coincident retaining tabs 37 and 38, it being understood that these locking tabs are secured simultaneously with the tabs 27 and 28.

For the purpose of providing billboard space at the end of the wrapper and also for the purpose of securely holding the packaged items against outward movement out of the end of the wrapper and also to eliminate undesired relative vertical movement between the packaged items, a pair of end panels 47 and 48 are foldably joined along fold lines 49 and 50, respectively, to the ends of main panel 1. In accordance with the invention, can chime receiving slits 51 and 52 are formed along the fold line 49 and similarly slits 53 and 54 are formed along the fold line 50. Thus in accordance with one facet of the invention, a particular can such as C1 is securely held within the slot 53 and in similar fashion an adjacent can C2 is secured with respect to the main panel 1 by virtue of the can chime receiving slit 54. Since the wrapper is moderately though not excessively tight, the slits 53 and 54 in accordance with the invention serve to prevent substantial relative vertical movement between adjacent cans such as C1 and C2. In this way damage to adjacent cans is avoided and a stable package obtained without requiring heavy duty paperboard capable of withstanding substantial tensile stress. Furthermore, the moderate tension of the wrapper does not impose substantial tensile stress on the packaged items.

It is apparent that the slits 53 and 54 and the slits at the other end of top panel designated at 51 and 52 are aided by the slits formed along the bottoms of the side walls and designated by the numerals 18–23. Thus the bottoms of the cans are locked with respect to the composite bottom wall by virtue of the slits at the bottoms of each side wall and the tops of the end articles are held in place by virtue of the slits 51–54.

The end panels 47 and 48 are held in a secure vertical position of perpendicular relationship to the top and bottom of the carrier by virtue of the web panels 55, 56, 57 and 58 formed at each corner of the main panel 1 and interconnected between the ends of the end panels and to suitable anchor panels. For example, web panel 55 is foldably joined to one end of end panel 47 by fold line 59 and is likewise foldably joined along a fold line 60 to the adjacent anchor panel 61 which in turn is foldably joined to side wall 10 along fold line 62. Similarly web panel 56 is foldably joined to the end of end panel 47 along fold line 63 and also is joined to anchor panel 64 along fold line 65, the anchor panel 64 being foldably joined to side wall 11 along fold line 66. Similarly web panel 57 is connected with end panel 48 along fold line 67 and is connected to anchor panel 68 along the fold line 69, the anchor panel 68 being foldably joined to side wall 10 along fold line 70. In like fashion, web panel 58 is foldably joined to end panel 48 along fold line 71 and is foldably joined to anchor panel 72 along fold line 73, end panel 72 being foldably joined to the end of side wall 11 along fold line 74.

When assembled the anchor panels 61, 64, 68 and 72 are folded flat against the inner surfaces of the ends of side walls 10 and 11. It will be understood that the anchor panels 61, 64, 68 and 72 must have a width at least as great as the radius of the packaged items such as C1 and C2 because of the fact that the packaged items themselves serve to hold the anchor panels in place and flat against the insides of the side walls.

The secure holding action of the end panels and associated web panels and anchor panels is achieved in accordance with this invention by virtue of particular angular relationships between these elements. For example, and with reference to FIG. 4 the angle between the fold lines 65 and 66 is designated by the letter "A" and is referred to herein as the anchoring angle while the angle defined by the fold lines 63 and 65 is herein referred to as the web angle. For convenience, the vertex of the web 56 is designated in FIGS. 3 and 4 by the letter "V."

If the anchoring angle "A" were forty-five (45) degrees instead of substantially greater than forty-five (45) degrees as taught by this invention, the areas of paperboard on each side of the fold line 65 would tend to collapse in flat face contacting relation to each other and the end panel 47 would tend to assume a rectangular shape, i.e., the fold line 63 would simply tend to be a continuation of the fold line 12 and the end panel 47 would simply be in the shape of a rectangle completely closing the upper end of the carrier. Such an arrangement would not afford secure holding action for the articles within the wrapper nor would it insure that the end panel 47 would assume a flat vertical relationship. The flat vertical relationship of the end panels 47 and 48 is important because the tendency of these panels is to bulge outwardly near the middle of the carton and such outward bulging causes the end panel of one carton to hang up on parts of adjacent cartons and thus tends to destroy the package or to impair its security. Thus according to the invention, the end panels 47 and 48 are held securely in vertical relationship and under substantial though moderate tension from end to end by virtue of the large anchoring angle designated at "A" and which is substantially greater than forty-five (45) degrees. In like fashion the fold line 63 is angularly spaced from the fold line 65 by the web angle designated in FIG. 4 by the letter "W." Stated otherwise, in order to interconnect the fold line 63 at the end panel 47 with the anchoring panel it is necessary to provide a web panel 56 whose web angle "W" is substantially equivalent to the anchoring angle "A." Actually, web angle "W" should be slightly larger by approximately two (2) degrees for most can sizes than the anchoring angle "A" due to the fact that the web panel 56 is made tightly to conform to the periphery of the packaged can so as to form a secure holding action therefor. Thus the web angle "W" is recited in the claims as being slightly larger than the anchoring angle "A" the magnitude of the difference between these angles being generally dependent upon the height of the end panels 47 and 48 together with the radius of the particular packaged items as will be obvious to one skilled in the art.

Since the webs 55, 57 and 58 are arranged in a manner identical to the arrangement of web 56 relative to the adjacent parts, a detailed description of webs 55, 57 and 58 and their relationships to their adjacent parts is not deemed necessary.

While I have shown and described a particular embodiment of the invention, I do not wish to be limited thereto and intend in the appended claims to cover all such changes and modifications as fall within the true spirit and scope of the invention.

What I claim as new and desire to secure by Letters Patent of the United States is:

1. A package comprising two rows of cylindrical objects arranged in close parallel relation to each other, the objects having chimed ends, a rectangular main wall disposed in flat parallel relation to the ends of the objects, said main wall being slightly wider than twice the diameter of the objects including their chimes, a pair of [rectangular] side walls foldably joined respectively along opposite side edges of said main wall and adjacent the sides of the objects, a pair of lap panels having their side edges foldably joined respectively to the edges of said side walls remote from said main wall and extending in flat parallel relation to the ends of the objects remote from said main wall, means securing said lap panels together to form a composite wall of a width slightly less than said main wall, an anchor panel foldably joined to each end edge of each side wall, said anchor panels being at least as wide as the radii of the objects and being folded flat against the inside of said side walls, an end panel foldably joined to each end of said main panel and disposed in normal relation to said main panel and adjacent the sides of the objects, a pair of slots formed in the fold line between each end panel and said main panel, each slot corresponding to one row of objects and being arranged to receive the chime of the end can in one row of objects, a generally triangular web panel foldably joined to each end of each end panel and to the adjacent end of the adjacent anchor panel and with the vertex of said web panel at the adjacent corner of said main panel, the anchoring angle (A) defined by the fold line between each anchor panel and the adjacent web panel and by the fold line between each anchor panel and the adjacent side wall being substantially greater than forty-five (45) degrees and the web angle (W) defined by the fold line between each web and the adjacent anchor panel and by each web and the adjacent end panel being slightly greater than said anchoring angle, and a plurality of chime receiving slots formed along the fold lines between each lap panel and the associated side wall.

2. A package comprising two rows of cylindrical objects arranged in close parallel relation to each other, the objects having chimed ends, a rectangular main wall disposed in flat parallel relation to the ends of the objects, said main wall was being slightly wider than twice the diameter of the objects including their chimes, a pair of side walls foldably joined respectively along opposite side edges of said main wall and adjacent the sides of the objects, a pair of lap panels having their side edges foldably joined respectively to the edges of said side walls remote from said main wall and extending in flat parallel relation to the ends of the objects remote from said main wall, means securing said lap panels together to form a composite wall of a width slightly less than said main wall, an anchor panel foldably joined to each end edge of each side wall, said anchor panels being at least as wide as the radii of the objects and being folded flat against the inside of said side walls, an end panel foldably joined to each end of said main panel and disposed in normal relation to said main panel and adjacent the sides of the objects, a pair of slots formed in the fold line between each end panel and said main panel, each slot corresponding to one row of objects and being arranged to receive the chime of the end can in one row of objects, a generally triangular web panel foldably joined to each end of each end panel and to the adjacent end of the adjacent anchor panel and with the vertex of said web panel at the adjacent corner of said main panel, the anchoring angle (A) defined by the fold line between each anchor panel and the adjacent web panel and by the fold line between each anchor panel and the adjacent side wall being substantially greater than forty-five (45) degrees and the web angle (W) defined by the fold line between each web and the adjacent anchor panel and by each web and the adjacent end panel being slightly greater than said anchoring angle, a plurality of chime receiving slots formed along the fold lines between each lap panel and the associated side wall, and a reinforcing panel foldably joined to each end of each lap panel and to the adjacent end of the adjacent anchor panel, locking tabs respectively formed in the reinforcing panels which are adjoined to one of said lap panels and arranged to coincide with similar locking tabs thus formed in the associated lap panels when such reinforcing panels are folded flat against the inside surface of said one lap panel, and locking openings respectively formed in the reinforcing panels adjoined to the other of said lap panels and arranged to coincide with similar locking openings formed in the associated lap panel when such reinforcing panels are folded flat against the inside surface of said other lap panel said locking tabs being projected through said locking openings to hold the reinforcing and lap panels in overlapping relationship.

References Cited by the Examiner

The following references, cited by the Examiner, are of record in the patented file of this patent or the original patent.

UNITED STATES PATENTS

| | | | |
|---|---|---|---|
| 2,713,450 | 7/1955 | Williamson | 206—45.31 |
| 2,713,451 | 7/1955 | Williamson et al. | 206—45.31 |
| 2,751,730 | 6/1956 | Gentry | 206—65 |
| 2,765,073 | 10/1956 | Murray | 206—65 |
| 2,805,791 | 9/1957 | Arneson | 206—65 |
| 2,911,136 | 11/1959 | Stone | 206—65 |
| 2,922,561 | 1/1960 | Currivan | 206—65 |
| 3,006,530 | 10/1961 | Forrer | 206—65 |

FOREIGN PATENTS

| | | |
|---|---|---|
| 221,022 | 4/1962 | Austria. |
| 643,723 | 6/1962 | Canada. |
| 736,218 | 9/1955 | Great Britain. |

LOUIS G. MANCENE, *Primary Examiner.*